(12) United States Patent
Bartlett et al.

(10) Patent No.: US 8,223,741 B1
(45) Date of Patent: Jul. 17, 2012

(54) ACTING ON DATA PACKETS IN A MOBILE TELECOMMUNICATIONS NETWORK BASED ON INNER HEADERS

(75) Inventors: Roger Danforth Bartlett, Merriam, KS (US); Kristin Ann Hayne, Overland Park, KS (US); Bharath Reddy Medarametla Lakshmi, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 567 days.

(21) Appl. No.: 12/496,563

(22) Filed: Jul. 1, 2009

(51) Int. Cl.
*H04J 3/24* (2006.01)

(52) U.S. Cl. ........................................ 370/349

(58) Field of Classification Search .............. 370/349, 370/329, 401, 354, 338, 392, 398, 312, 411, 370/395.31, 395.21; 709/238; 455/436
See application file for complete search history.

(56) References Cited

U.S. PATENT DOCUMENTS

| 7,324,517 B1 * | 1/2008 | Sundaresan et al. | 370/392 |
| 7,693,508 B2 * | 4/2010 | Leung et al. | 455/412.1 |

FOREIGN PATENT DOCUMENTS

WO     2007082587 A1     7/2007

* cited by examiner

*Primary Examiner* — Chi Pham
*Assistant Examiner* — Alexander Boakye

(57) ABSTRACT

Methods, system, and medium are provided for referencing the original source or destination information of data packets on a mobile telecommunications network, including information in inner headers of data packets. The present invention enables monitoring of data traffic, or directing and balancing data packets in a mobile network, based on inner-header information.

19 Claims, 8 Drawing Sheets

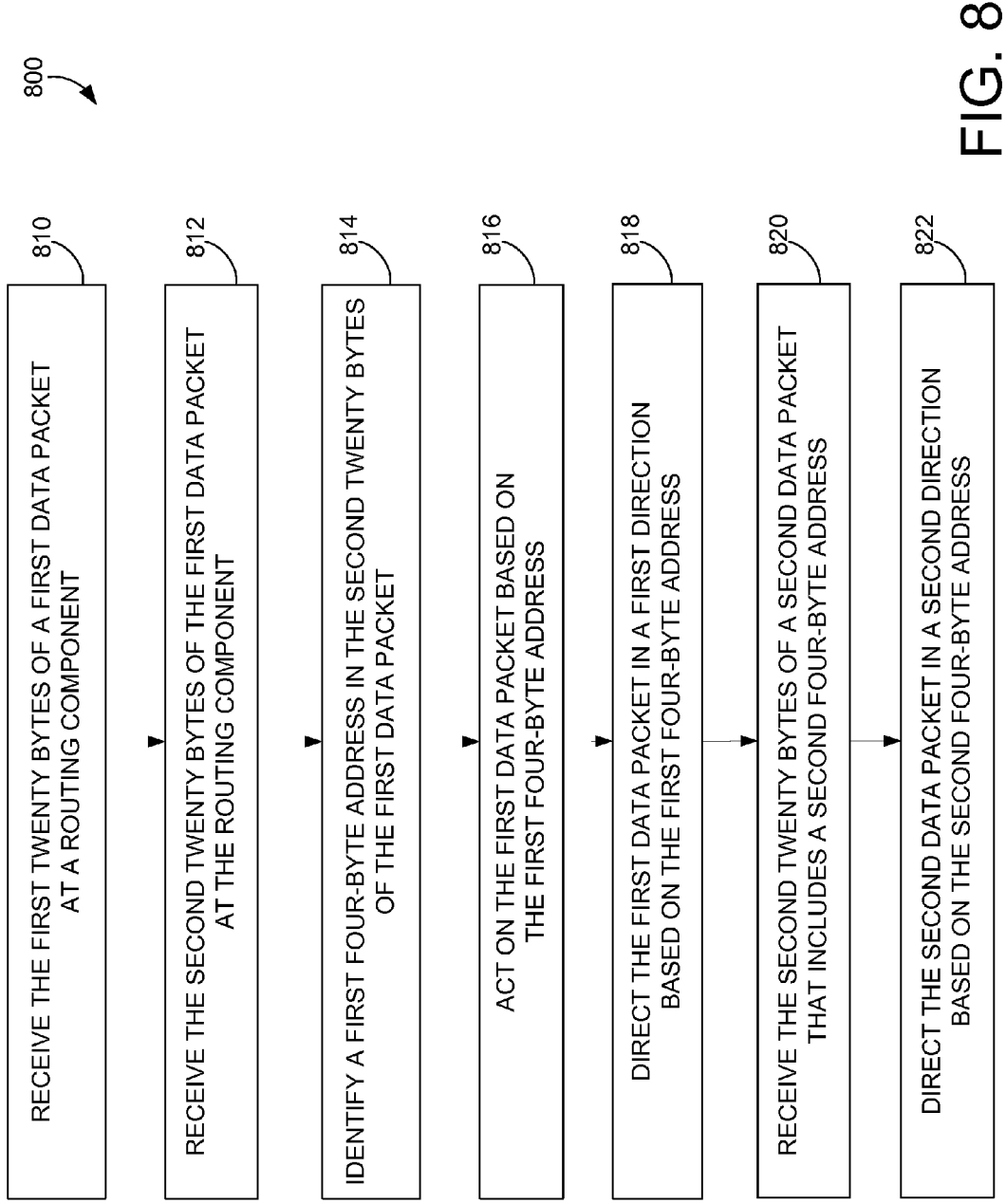

ACTING ON DATA PACKETS IN A MOBILE TELECOMMUNICATIONS NETWORK BASED ON INNER HEADERS

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first embodiment, a set of computer-executable instructions provides methods of referencing information in a data packet, such as information in an inner header, by a routing component on a mobile telecommunications network. The inner header indicates an original source address and destination address, used by the Internet to route data packets, in this exemplary embodiment. The inner header is received by the routing component after a second header that has been added to the front of the data packet (prepended), such as a second header indicating source and destination addresses within the mobile telecommunications network, in embodiments of the present invention.

In a second embodiment, during an Internet session, a mobile device sends and receives data packets to and from the Internet (specifically, an address on the Internet) via a mobile telecommunications network, or core network. The mobile device is associated with an agent on a home portion of the core network (a home agent). When the mobile device uses another portion of the core network, it communicates with a foreign agent, which directs traffic to the home agent, using the core network. In this example, data traffic on the core network includes an outer header (indicating the foreign agent and the home agent), and an inner header (indicating the mobile device and the Internet address). This data traffic, in more than one direction, is logged in association with the mobile device, in an exemplary embodiment of the present invention.

In a third embodiment, a data packet is made up of bytes, including a first set of bytes and a second set of bytes. On a network, the first set of bytes is received first by a routing component. In an exemplary embodiment, the second set of twenty bytes includes an address, such as an IP address, that is identified and used to act on (route, store, inspect, monitor, etc.) the data packet.

BRIEF DESCRIPTION OF THE SEVERAL VIEWS OF THE DRAWINGS

Illustrative embodiments of the present invention are described in detail below with reference to the attached drawing figures, and wherein:

FIG. 8 is a flow diagram illustrating exemplary methods in accordance with embodiments of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps disclosed herein unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CDMA | Code Division Multiple Access |
| FA | Foreign Agent |
| GE | Gigabit Ethernet |
| HA | Home Agent |
| IETF | Internet Engineering Task Force |
| IP | Internet Protocol |
| IPv4 | Internet Protocol version 4 |
| IPv6 | Internet Protocol version 6 |
| PDSN | Packet Data Serving Node |
| RF | Radio Frequency |
| RFC | Request for Comments |
| SPAN | Switched Port Analyzer Network |
| UDP/TCP | User Datagram Protocol/Transmission Control Protocol |
| VLAN | Virtual Local Area Network |

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-executable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
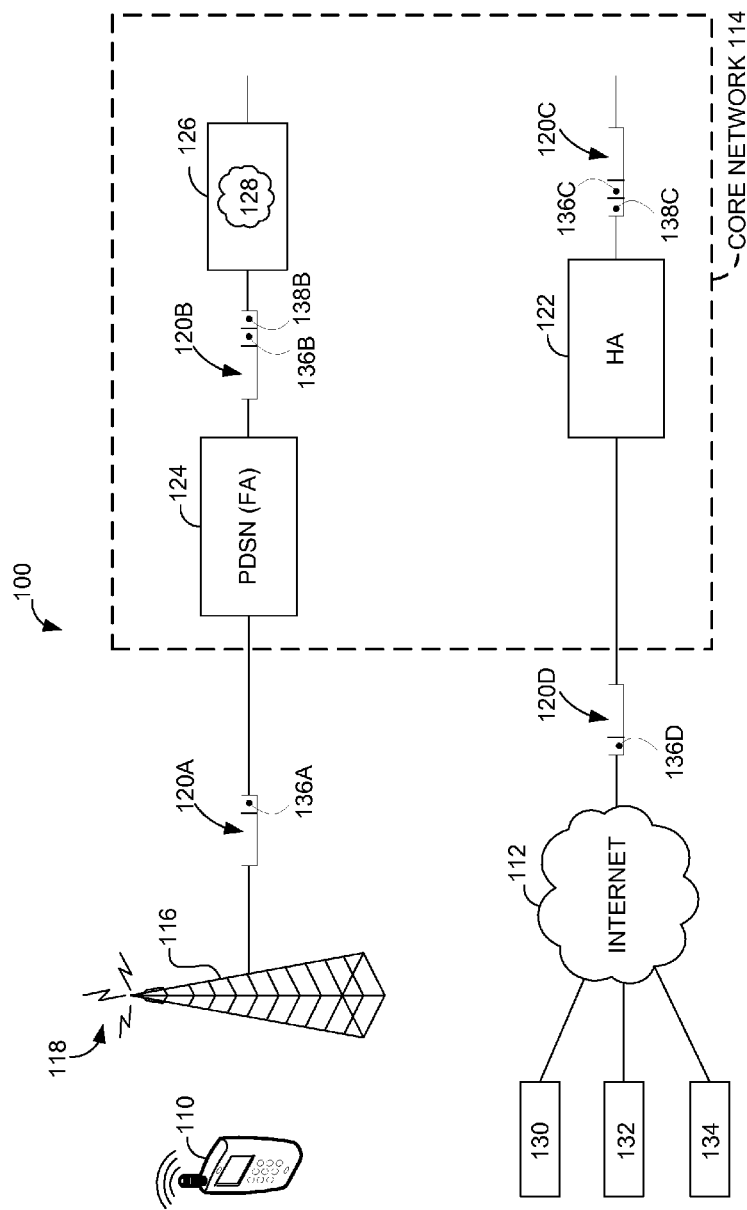
FIG. 1 is an illustrative operating environment suitable for practicing an embodiment of the present invention.

Embodiments of the present invention include one or more computing devices ("devices"), such as the mobile computing device 110 shown in FIG. 1. Computing devices in accordance with the present invention may be any computing devices capable of communicating over a mobile telecommunications network. Although mobile devices, such as cellular phones and laptops, are discussed with respect to exemplary embodiments below, it should be appreciated that any computing device able to send or receive data, where data is transmitted via a mobile telecommunications network at some point between the source and destination, is capable of operation in accordance with embodiments of the present invention.

Mobile devices can communicate with the Internet by using a mobile telecommunications network, or a core network, that enables data traffic between mobile devices and other entities on the Internet. In a specific example, a user of a mobile device enters an Internet address in order to view a website using the mobile device. This causes a request for website content to be transmitted from the mobile device, over a mobile telecommunications network, or core network, for ultimate receipt by the Internet address entered by the user. In response to receiving this request, content is transmitted from the Internet address, over the mobile telecommunications network, and ultimately to the mobile device for display to the user. In this example, the core network enables data traffic to flow between mobile devices and the Internet.

As discussed more fully below, a mobile telecommunications network, or core network, may include various subnetworks. In an example, a mobile device is attached to a "home" subnetwork in the mobile telecommunications network during an Internet session. The mobile device may move to a "foreign" subnetwork in the mobile telecommunications network during the Internet session. In this example, data traffic flows to and from the foreign subnetwork (where the mobile device is being used) to the home subnetwork associated with the mobile device, using outer headers added to data packets.

Although the outer headers may be used to direct data packets to a subnetwork on a mobile telecommunications network, the outer headers do not identify the original source or destination (i.e., the individual mobile device or Internet destination) of the data packets. The original source and destination are generally found in inner headers of the data packets on mobile telecommunications networks. Embodiments of the present invention enable inner headers of data packets to be referenced, or used to direct or inspect data traffic, on mobile telecommunications networks.

FIG. 1 illustrates an exemplary operating environment suitable for practicing an embodiment of the invention, designated generally by the numeral 100. A user of a mobile computing device ("mobile device" or "device"), such as device 110 in FIG. 1, communicates with the Internet 112 by utilizing a mobile telecommunications network, or core network, such as core network 114. In the exemplary operating environment shown in FIG. 1, mobile device 110 communicates with, or attaches to, the mobile communications network 114. A base station, such as base station 116, transmits a link, such as link 118, that is usable by mobile device 110 for attaching to the core network 114, and for sending and receiving data traffic to and from the Internet 112 via the core network 114. The link 118 may be a radio frequency link. In the specific example shown in FIG. 1, a data packet 120A is sent from the mobile device 110, using link 118, and ultimately directed to the Internet 112. For illustration purposes, data packet 120A may be a request by a user of mobile device 110 to view content from a website accessible through Internet 112.

Mobile devices, such as device 110, are generally registered, authorized or otherwise recognized by a network, in order to provide data services. In some cases, mobile devices are identified by a network when they are powered on, or they could be programmed, or coupled with certain software or hardware, to enable detection by a network. An address becomes associated with a mobile device, and this address is used to request and receive data by the mobile device. Mobile computing devices in accordance with embodiments of the present invention, such as device 110, are associated with unique addresses, for example, IP addresses. No two connections, computing systems or devices attached to the network have the same IP address (although one system may be reached by more than one IP address). Exemplary embodiments of the present invention, discussed in more detail below, include mobile devices with unique IP addresses. A computing system, group of devices, or other type of hardware or device identified by a network address, may be capable of use with embodiments of the present invention.

An address used by a mobile device is associated with a certain subnetwork, or portion, of a mobile telecommunications network. This may be considered the "home" portion of the core network for that particular mobile device (the "home subnetwork"). The home subnetwork may be the portion of the network that a mobile device typically uses or is recognized by, or, in some embodiments of the present invention, it is the portion of the core network that is used by a mobile device at the beginning, or initiation of, an Internet session. Therefore, in some cases, the home portion of the core network is a portion of a mobile telecommunications network, such as core network 114, that data traffic is sent to, or received from, on behalf of a mobile device that is "foreign" to the portion of the core network that the mobile device is being used on. In an embodiment of the present invention, the first portion of a mobile telecommunications network that a mobile device attaches to is considered the home portion, while any subsequent portions used by the device (during one or more data sessions) are foreign portions of the core network with respect to that device.

Mobile telecommunications networks can have portions of the core network, or subnetworks. Subnetworks may be associated with certain geographic or spatial areas, or subnetworks may be defined as areas reached by certain base station signals, such as the link 118 transmitted by base station 116 in FIG. 1. For example, an area reached by link 118, or where mobile devices are capable of attaching to the core network 114 using base station 116, is considered a subnetwork in an embodiment of the present invention. Subnetworks are generally associated with, or represented by, one or more devices or agents. As a specific illustration in FIG. 1, the home subnetwork of mobile device 110 is associated with home agent 122.

Home agent 122 represents a home subnetwork by sending or receiving traffic on behalf of certain mobile devices. As discussed above, a certain mobile device, such as device 110, may be associated with home agent 122 because it began a data session on a portion of the network represented by home agent 122. In embodiments of the present invention, the home agent 122 has access to information about mobile devices, such as device 110. This information may include one or more IP addresses associated with one or more mobile devices, thereby allowing home agent 122 to direct data traffic to and from the mobile devices. Home agent 122 may store this information locally, or obtain this information based on an event or signal. In an embodiment of the present invention, the home agent 122 stores information about mobile device 110 during a connection or Internet session.

When the mobile device 110 moves away from the portion of the network with the home agent 122, it attaches to a foreign agent, such as foreign agent 124 in FIG. 1. In embodiments of the present invention, when the data packet 120A is received by foreign agent 124, the data packet is on the core network 114, as shown at data packet 120B. The data packet 120B is directed from the foreign agent 124 to the home agent 122.

As shown in FIG. 1, the foreign agent 124 is a PDSN in an embodiment of the present invention. In addition to a PDSN, any component in the core network 114, or at an interface, or link, at an edge of the core network 114, may act as a foreign agent 124 by receiving a data packet originally from a mobile device, such as mobile device 110, and directing the data packet to the mobile device's home agent (e.g., home agent 122). Similarly, any component may act as a foreign agent 124 by receiving a data packet from a home agent 122 and directing the data packet for delivery to the mobile device 110. In fact, in some cases, an agent may be a home agent with respect to a first mobile device, and a foreign agent with respect to a second mobile device.

Multiple mobile devices are associated with an agent, such as foreign agent 124 or home agent 122, and an agent may be simultaneously acting as a foreign and home agent for various devices, in embodiments of the present invention. Components or network devices acting as foreign agent 124 and home agent 122 may perform additional functions on a mobile telecommunications network, or they may be included or embedded with other network devices. A physical separation between the components of the core network 114 in FIG. 1 is not required in order for the components, or software executed on one or more computing devices, to operate in accordance with embodiments of the present invention.

Conversely, physical attachments are not required, nor intended to be implied by the embodiments or figures discussed herein. Embodiments of the present invention include SPAN data traffic, where traffic is mirrored from one interface to another destination on a network, such as a VLAN, which enables one Ethernet interface to receive data traffic from another Ethernet interface without physical attachment. Other types of interfaces, or mobile network components, may send and receive data packets on a mobile telecommunications network, such as core network 114, without physical links.

To the extent a device, link or interface is discussed as being at, or on, an edge or boundary of a mobile telecommunications network, such as core network 114, the edge or boundary is not distinct or inflexible in embodiments of the present invention. More than one step or process may be performed, by one or more computing devices, for a data packet to cross an edge or boundary of a mobile telecommunications network. Additional components, programs, or tasks may exist at the edge of a core network 114, such as firewalls, filters or other hardware or software components that implement security policies or protocols.

In an embodiment of the present invention, an edge of a core network, such as core network 114 in FIG. 1, includes variations based on predetermined settings or the direction of data traffic. For example, data packets received from the Internet 112 may be subject to a certain verification process at the edge of the core network 114, while data packets received from a mobile device, such as device 110, are not subject to the verification process. In some cases, an agent, such as foreign agent 124 or home agent 122, functions as a boundary, and this role is not affected by additional devices, programs or software, proximate to the agent that may act as additional layers at the edge of a network. Additionally, embodiments of the present invention are operable with an IP-based Code Division Multiple Access (CDMA) 2000 packet-data cellular telecommunications network, a North American third-generation cellular standard.

When the data packet 120B is in the mobile telecommunications network 114, it is received by a routing component, such as routing component 126 in FIG. 1. Routing component 126 may be a router, a network switch device or one or more computing devices running software, such as software or computer-executable instructions shown at 128. In an embodiment of the present invention, the routing component 126 supports link aggregation. For example, in one embodiment, the routing component 126 supports link aggregation based on standards promulgated by the IEEE 802.3ad task force. Data packets, such as data packet 120B in FIG. 1, are received by the routing component 126 through one or more ports, such as 10G ports. Although the exemplary embodiment discussed here includes a link aggregation standard and ports that may be used with gigabit Ethernet (GE) data traffic, this example is not intended to limit the amount of, or capacity for, data traffic that may be operable with embodiments of the present invention.

A routing component in accordance with an embodiment of the present invention, such as routing component 126 in FIG. 1, receives data packets (e.g., data packet 120B) in accordance with mobile internet protocol standards developed by the Internet Engineering Task Force. In a specific example, data traffic between the foreign agent 124 and the home agent 122 is Mobile IPv4 traffic, described in the IETF Request For Comments No. 3344, or Mobile IPv6 traffic, described in IETF RFC 3775.

In IP-based traffic, certain sources and destinations may be considered "layers," with a top, or first, layer representing a user application, and a bottom layer representing the physical transmission of data. Multiple layers between the application layer and the physical layer may each be represented by different source and destination information included in data packets. In other words, more than one layer of source and destination information may be included in a data packet. For example, in an embodiment of the present invention, data packets, such as packet 120B, include information about more than one layer of the exemplary operating environment shown in FIG. 1. In this specific example, a second layer is the "transport" layer, and the second-layer source and the second-layer destination are the foreign agent 124 and the home agent 122, respectively, indicated by outer header 138B of data packet 120B. Therefore, in this particular example, the outer header 138B indicates second-layer source and destination information.

Continuing with the specific exemplary embodiment, a third layer is the "Internet" layer, indicating an original source and destination address associated with, for example, a mobile device and an Internet site. Third-layer source and destination information is indicated by the inner header 136B in data packet 120B, in an embodiment of the present invention. In some cases, data packets, such as packet 120B, include fourth-layer information, indicating UDP/TCP ports associated with the data packets. Traffic on mobile communications networks, between a foreign agent and a home agent, may be viewed or treated as one flow or conversation (over one or more physical links), and generally only the second-layer source and destination (i.e., the outer header 138B source and destination) is used to direct traffic on a mobile telecommunications network. Embodiments of the present invention enable data packets (e.g., packet 120B) on a mobile telecommunications network, such as core network 114, to be directed based on second-, third-, or even fourth-layer source or destination information, or directed based on more than one layer at a time, and embodiments of the present invention include load-balancing data traffic on a core network 113 based on one or more layer associated with the data traffic.

Load balancing includes routing data packets to available sites, links or other destinations, physically or virtually, based on availability or other criteria used to optimize the transmission of data traffic. In a specific example, parallel GE links may exist between, or be used for data traffic between, a foreign agent and a home agent, such as foreign agent 124 and home agent 122 in FIG. 1. Using the inner header information of data packets on the core network 114, data packets, such as data packet 120B, may be directed to a certain GE link.

Embodiments of the present invention enable preservation and optimization of a data traffic flow of data packets that have the same original destination. In the exemplary data packet in FIG. 1, an address for the original destination is included in an inner header, shown at 136B of data packet 120B. Embodiments of the present invention act on data packets based on the inner header, which enables multiple data packets, with different original destinations, such as destinations 130, 132, and 134, to be routed, analyzed or otherwise acted on based on these three different destinations, 130, 132, and 134, as opposed to the home agent destination 122 that the multiple packets share in outer header 138B in FIG. 1. A routing component, such as routing component 126 that includes computer-executable instructions 128, recognizes information in inner header 136B of data packet 120B. As illustrated in the example shown in FIG. 1, routing component 126 recognizes inner header 136B information without removing or affecting outer header 138B. For example, the data packet is shown as data packet 120C with outer 138C intact, even during action on the data packet based on inner header 136C. The inner header is shown at 136D of data packet 120D. In embodiments of the present invention, home agent 122 is an agent that strips off, or removes, outer header 138C of data packet 120C.

Figure 2:
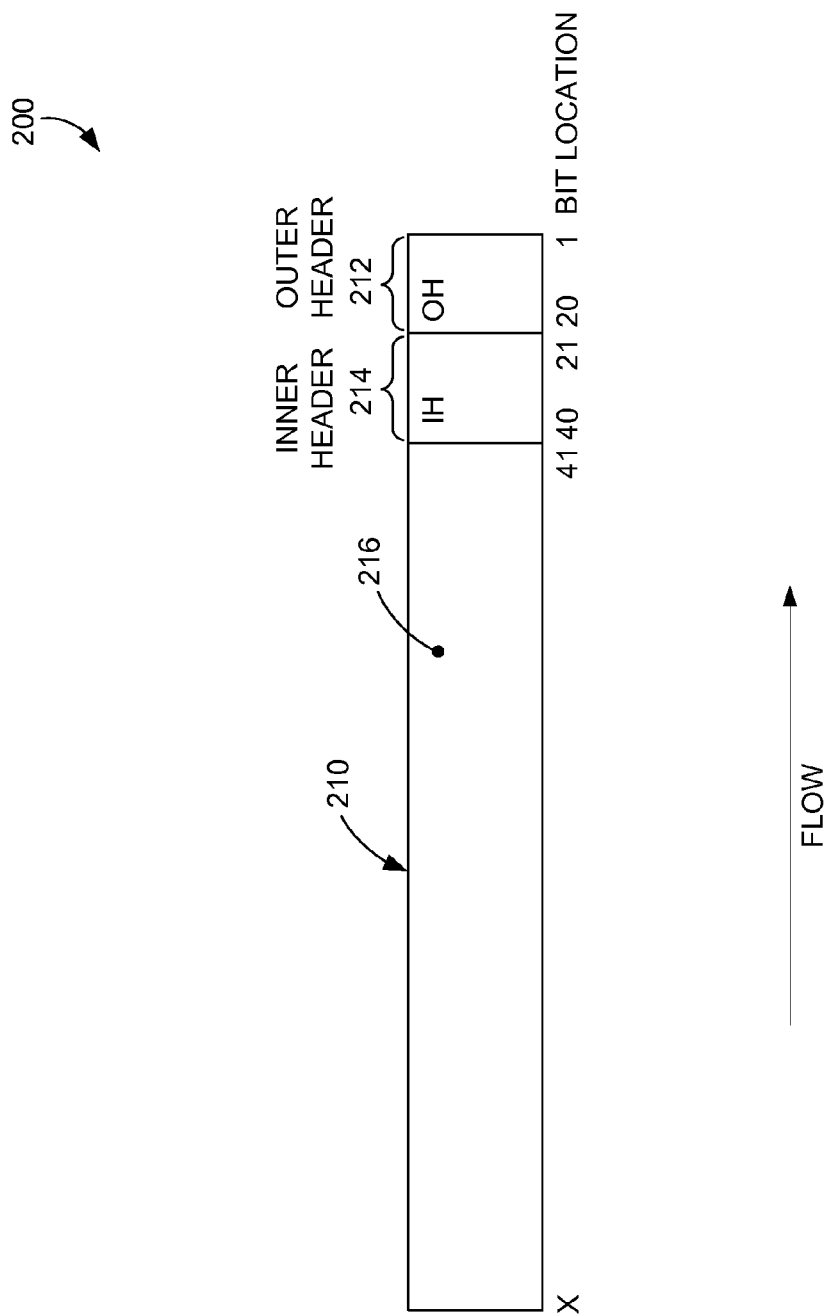
FIG. 2 is a diagram illustrating an exemplary data packet in accordance with an embodiment of the present invention.

FIG. 2 is a diagram illustrating an exemplary data packet in accordance with an embodiment of the present invention, designated generally by reference numeral 200. The data packet 210 is shown with bit location values increasing from right to left. Data packet 210 flows in the direction shown by the arrow in FIG. 2, indicating the first bit location is received first by devices on a network, such as core network 114 in FIG. 1. As shown in the exemplary data packet 210 in FIG. 2, an outer header 212 is located in the first twenty bytes, shown at bit locations with values 1 through 20. In embodiments of the invention discussed in more detail herein, the outer header 212 includes source and destination information used by the core network, but the outer header 212 does not include the original source and destination information, such as the unique address of a mobile device (e.g., device 110 in FIG. 1), and an Internet address outside of the core network (e.g., Internet destination 130 in FIG. 1).

The original source and destination information is included in the inner header 214 of the data packet 210, shown as an example in FIG. 2. The inner header 214 is located at bit location values 21 through 40 (i.e., the second twenty bytes received by devices on a network). Bit location value 41 is the beginning of the remainder 216 of the data packet 210 (besides the inner header 214 and the outer header 212) in the exemplary data packet 210 in FIG. 2. For example, the remainder 216 of the data packet 210 includes a payload of data, such as content from Internet sites or data input by users of mobile devices.

In some embodiments of the present invention, the remainder 216 of the data packet 210 includes optional sections, such as "Options" information, expiration or formatting data, or any other data or metadata that is included in a data packet, such as packet 210, that is not included in the headers of the data packet, for example headers 212 and 214. In some embodiments of the present invention, data packets may include an upper layer indicating tunneled traffic, or traffic on a mobile telecommunications, where a destination address is used to indicate an original source address and an original destination address. Data packets in such a format are operable with embodiments of the present invention, and original source and destination information may be obtained at an offset in such data packets. A specific hash algorithm is applied in embodiments of the present invention to account for variations to data packets, such as the example discussed here.

Figure 3:
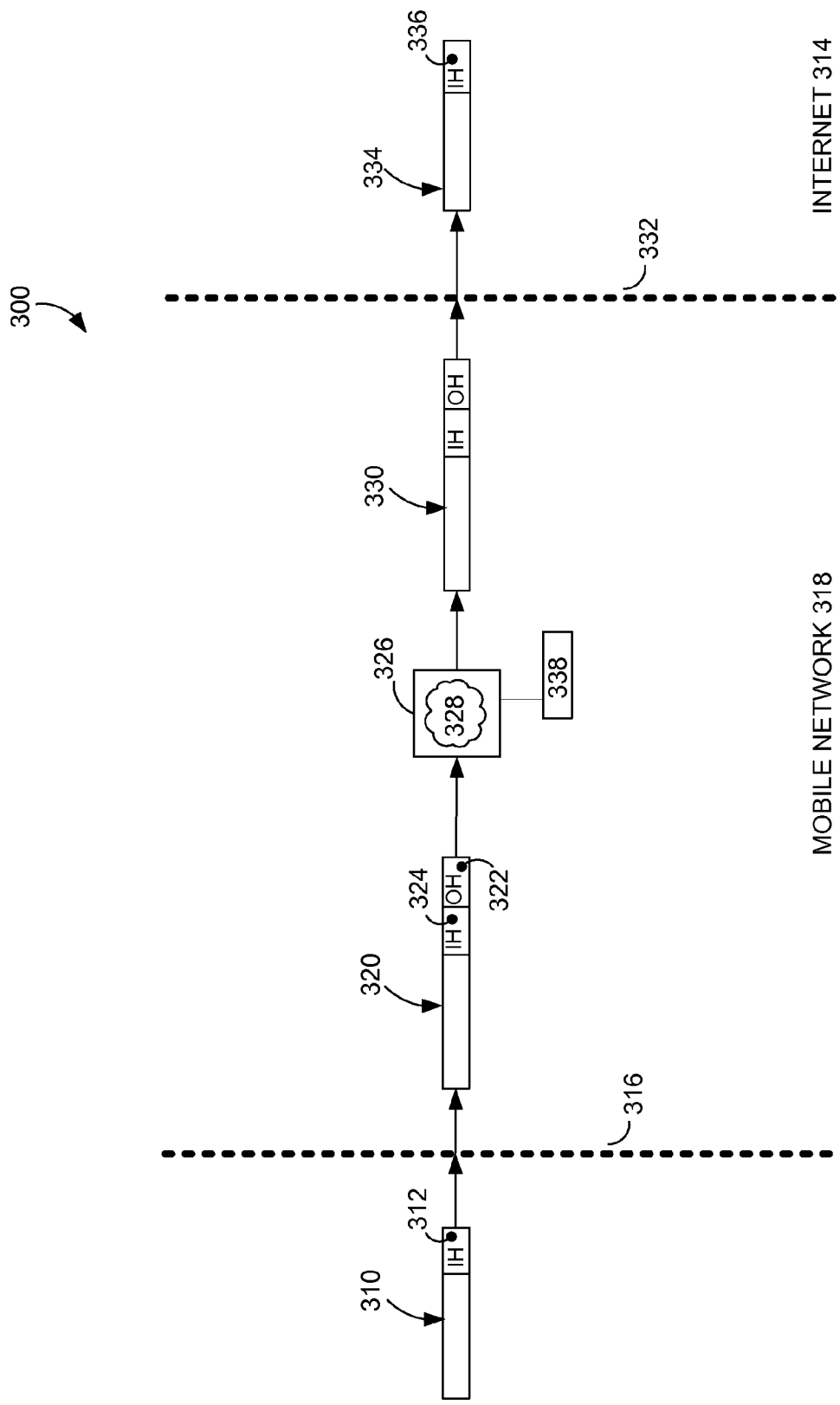
FIG. 3 is a flow diagram illustrating an exemplary flow of a data packet on a mobile telecommunications network in accordance with an embodiment of the present invention.

FIG. 3 is a flow diagram illustrating an exemplary flow of a data packet on a mobile telecommunications network in accordance with an embodiment of the present invention, designated generally by reference numeral 300. As shown in FIG. 3, a data packet 310 includes an inner header 312. In one example, the data packet 310 indicates a user of a mobile device, such as device 110 in FIG. 1, is uploading a photo to a website on the Internet, shown at Internet 314. Therefore, the inner header 312 indicates the mobile device is the source of the data packet 310, and the inner header 312 also indicates the website is the destination of the data packet 310. In this example, the addresses of the mobile device and the website are the "original source and destination" addresses of data packet 310, and they are included in inner header 312.

When the data packet 312 crosses an interface 316 to a mobile telecommunications network 318, an additional header is added to the front end of the data packet. The data packet, once in the mobile network 318, is shown as data packet 320 with an additional header, shown as outer header 322. The inner header is shown as inner header 324 of data packet 320 once in the mobile network 318. Data packets in the mobile network 318 pass through a routing component 326 in embodiments of the present invention. The routing component 326, including computer-usable instructions 328, may direct data packets, such as data packet 320, based on the inner header 324 information. As shown in FIG. 3, the data packet 320, even after passing through a routing component 326 that references the inner header 324, is shown at data packet 330 with the headers intact. The actions taken on data packets, such as packet 320, by routing component 326, do not necessarily change the data packet 320 in any way, an the inner header 324 may be used by components on a mobile network 318 without removing a portion of, or altering, the data packet 320.

When a data packet, for example packet 330 in FIG. 3, leaves a mobile network 318 for the Internet 314, it crosses interface 332 in an embodiment of the present invention. Interface 332 may represent a home agent, such as home agent 122 in FIG. 1, that removes a header usable by the mobile network 318, such as outer header 322 in data packet 320. As shown at data packet 334 in FIG. 3, only an inner header 336 is present in the data packet 334 on the Internet 314. An agent or component at the edge 332 of the mobile network 318 may store information about the original source or destination represented by inner header 336, and the agent, such as home agent 122 in FIG. 1, may direct data packets to an original destination address on the Internet 314. In embodiments of the present invention, a device or components at the edge 332 of a mobile network 318 has access to tables, algorithms or other information used to route or transmit data packets, such as packet 334, on behalf of mobile devices, such as device 110 in FIG. 1, associated with the component that is at the edge 332 of the mobile network 318.

As shown in FIG. 3, data packets may pass through routing component 326 without appearing affected, as shown at packet 330. In an embodiment of the present invention, information about or from data packets on the mobile network 318 is stored at, or by, a network device, such as network device 338. The stored information may indicate the original source or destination of packets in the mobile network 318, such as the source or destination indicated by an inner header 324 of data packet 320. Other stored information could be indicate the amount of data included in data packet 320, or other features of data traffic in the mobile network 318.

A routing component, such as routing component 326, may direct data packets to one or more boxes for future reference. The data packets directed for future reference may be copies or images of data packets. In an exemplary embodiment, data packets are directed to one or more boxes, such as twenty-gigabyte platform boxes, or "e100" boxes. In a specific example, traffic on 10G port of a VLAN is directed to one or more DPI boxes according to a MAC (Mandatory Access Control) level access list. The ports, in exemplary embodiments of the present invention, are truck ports identified by VLAN numbers, such as such as Black 100 or Blue 101. The specific capacities and network architecture structures discussed in this example are not intended to limit the types or sizes of ports, or virtual or physical network architectures, operable with embodiments of the present invention.

Figure 4:
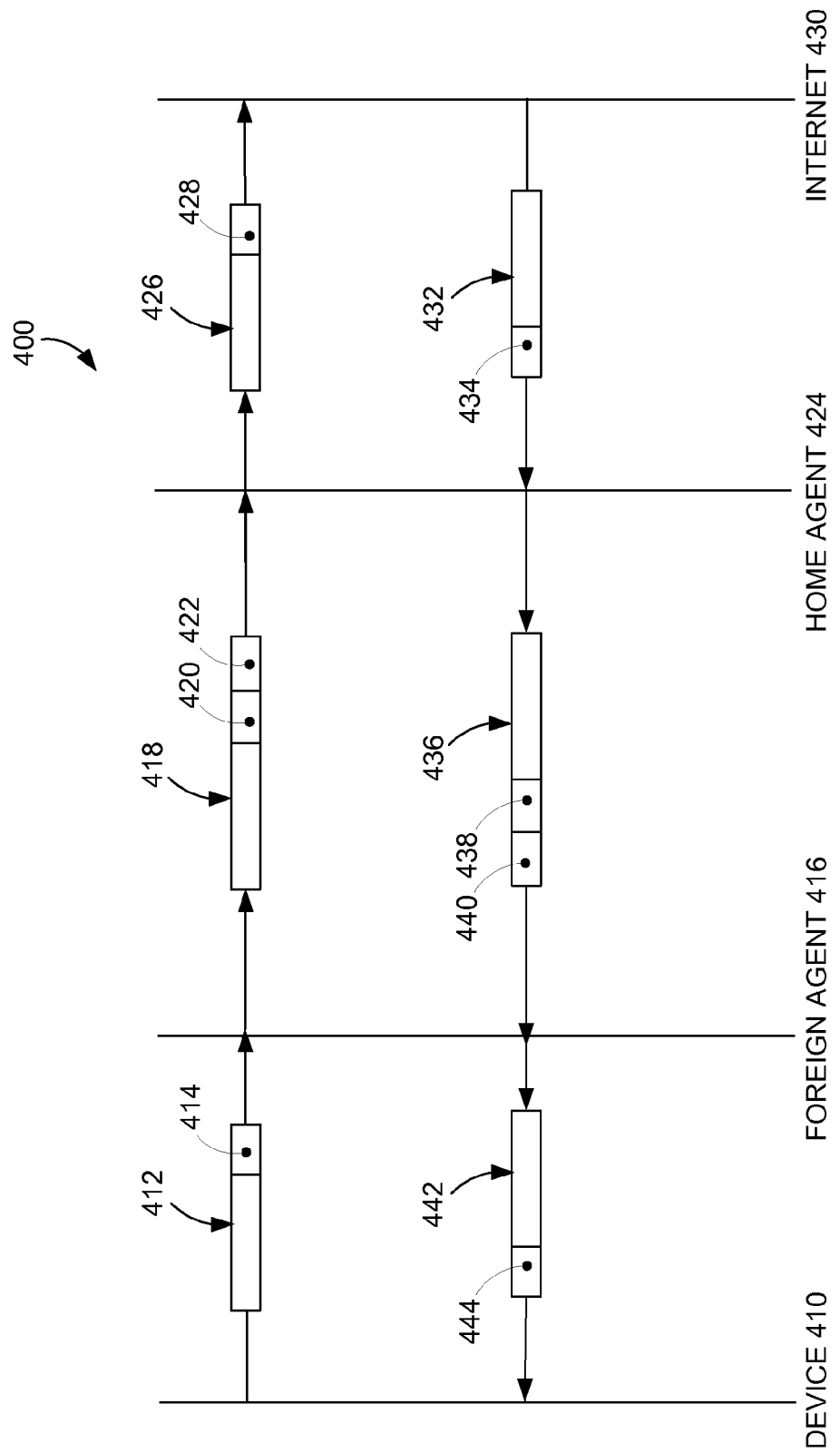
FIG. 4 is a flow diagram illustrating an exemplary flow of data traffic on a mobile telecommunications network in accordance with an embodiment of the present invention.

FIG. 4 is a flow diagram illustrating an exemplary flow of data traffic on a mobile telecommunications network in accordance with an embodiment of the present invention, designated generally by reference numeral 400. In an example, a mobile device 410 communicates a data packet 412 to a foreign agent 416, using, for example, the link 118 shown in FIG. 1. Data packet 412 from the mobile device 410 includes one header, shown as first header 414. As an example, a user of the mobile device 410 triggered data packet 412 by entering a website address and requesting to view content from the website. As a specific example, the user of device 410 entered the web address www.ABC.com into a browser on device 410. The first header 414 includes a source address indicating the mobile device 410, and a destination address indicating the IP address of www.ABC.com.

The addresses used in the headers shown in FIG. 4, such as first header 414, are IP addresses in embodiments of the present invention. IP addresses may be expressed in a dotted decimal notation, and, in embodiments of the present invention, each byte of a four-byte (thirty-two bit) IP address is separated by a decimal point. The size of headers, or source or destination addresses within headers, may not be exact, and may accommodate variations, particularly where small differences in bit values represent features or information that may be optional or unaffected by embodiments of the present invention.

The data packet, shown as data packet 418, is directed from a foreign agent 416, and includes the first header, now shown as inner header 420, and a second, outer header shown as outer header 422. Data packet 418 travels between a foreign agent 416 and a home agent 424. The data packet, shown as data packet 426, including the inner header shown as header 428, is directed from the home agent 424 to the Internet 430. In some embodiments of the present invention, data traffic from a mobile device 410 to the Internet 430 flows between the foreign agent 416 and the home agent 424, but return traffic from the Internet 430 to the mobile device 410 may bypass the agents 416 and 424. In other embodiments, traffic in both directions may pass between the agents 416 and 424, as discussed herein with respect to FIG. 4.

Continuing with the specific example discussed above, the Internet 430 may return a data packet from www.ABC.com, such as data packet 432, intended for receipt by mobile device 410. In this example, the first header of data packet 432, shown as first header 434, includes source information indicating www.ABC.com and destination information indicating mobile device 410. The source information indicating www.ABC.com may be an IP address of a location on Internet 430. When the data packet from the Internet 430 is between home agent 424 and foreign agent 416 (for ultimate delivery to mobile device 410), it is shown as data packet 436. The source information indicating www.ABC.com, and the destination information indicating mobile device 410, is now in an inner header 438 of data packet 436, and an outer header 440 has been added to the data packet 436. When the data packet passes through a foreign agent 416, or a device acting as an edge or boundary of a mobile telecommunications network, the outer header is removed, as shown at data packet 442, which includes an original header 444 indicating www.ABC.com as the source of the data packet 442, and the mobile device 410 as the destination of the data packet 442.

The source or destination information in the inner header 438 of data packet 436 may be determined and used for further action in embodiments of the present invention. For example, data packets, such as data packets 418 and 436 in FIG. 4, may be analyzed for original source and destination information. This allows monitoring of data traffic for information such as the popularity of sites (e.g., www.ABC.com), the amount of data transmitted to certain mobile devices (e.g., device 410), or the times, frequencies, or locations of data traffic to certain entities. Accounting, or administering policies or inspections, may be based on inner header information, such as inner headers 420 and 438 in data packets 418 and 436, respectively. Additionally, load balancing among physical or virtual links on a mobile telecommunications network may be based on inner header information in embodiments of the present invention.

Figure 5:
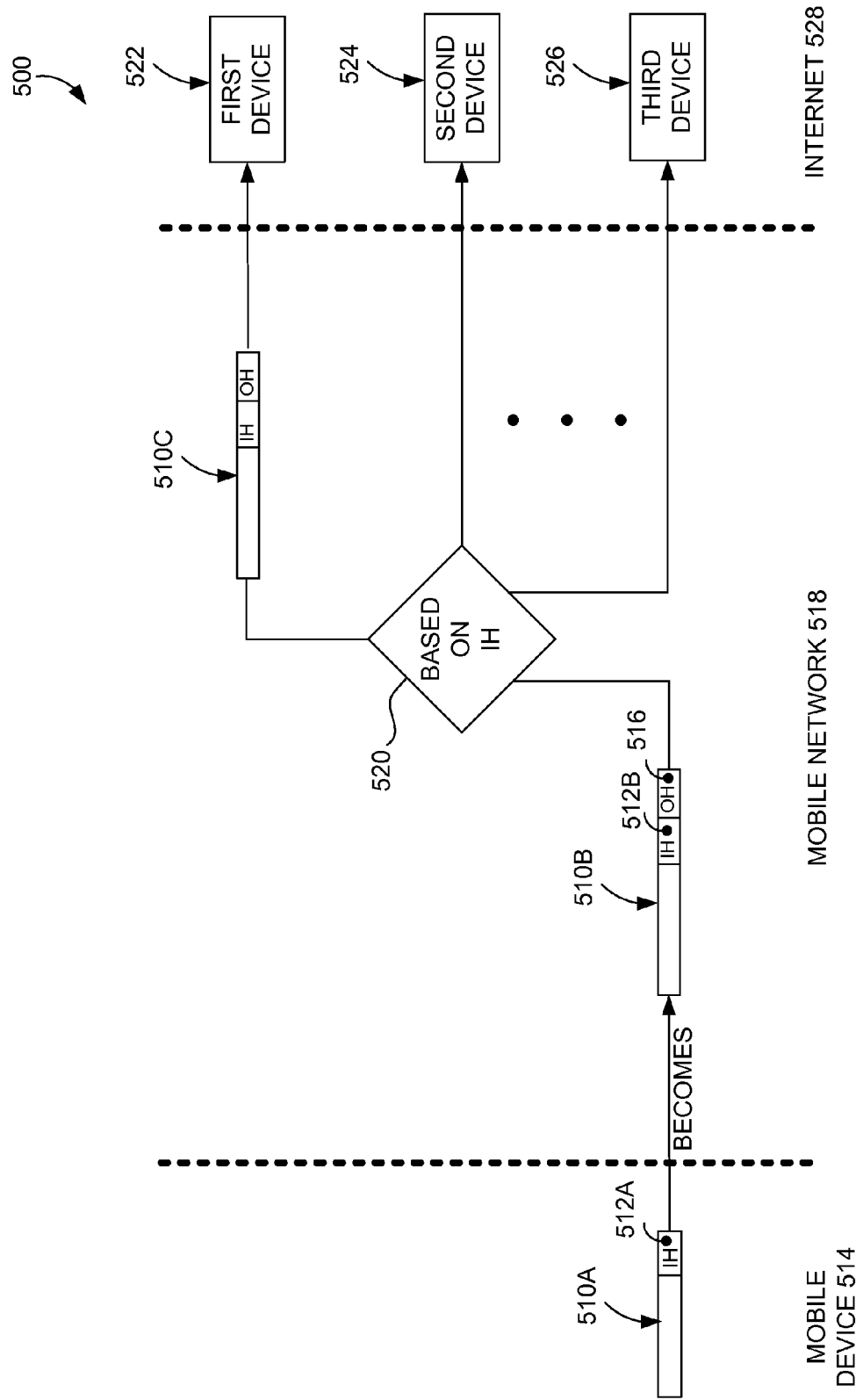
FIG. 5 is a flow diagram illustrating exemplary data traffic on a mobile telecommunications network in accordance with an embodiment of the present invention.

FIG. 5 is a flow diagram illustrating exemplary data traffic on a mobile telecommunications network in accordance with an embodiment of the present invention, designated generally by reference numeral 500. As shown in the embodiment in FIG. 5, a data packet 510A, including an inner header 512A, is received from a mobile device 514. The data packet becomes data packet 510B, including an outer header 516, on a mobile network 518. As shown at step 520, data packets on mobile network 518 (e.g. data packet 510B) are handled, identified or referenced for further action, based on inner headers, such as inner header 512B. As illustrated by data packet 510C, even after step 520 based on an inner header 512B, outer headers 516B of data packets are preserved in embodiments of the present invention. The inner header information used at step 520 may indicate a data packet is destined for a first device 522, a second device 524 or a third device 526, via the Internet 528.

The destinations on the Internet 528, such as devices 522, 524, and 526, may be servers, networks or other hardware identified by an address on the Internet 528. There is no set amount of destinations subjected to step 520 in the mobile network 518. Although the specific example shown includes three devices 522, 524, and 526, any number of original sources or destinations may be handled at step 520, which may be performed by one or more computing devices in the mobile network 518.

In one embodiment, the amount of destination addresses for devices 522, 524, and 526 is used in a hash algorithm to divide data traffic into the same amount of paths, boxes or routes. For example, IP addresses of data packets, such as data packet 510B, may be divided by the number three, with the remainder indicating whether the data packet 510B will be routed in a first, second or third direction. In embodiments of the present invention, hash algorithms determine where a data packet is directed. In other embodiments, an address in the data packet is compared to a table, database or other reference information, accessible either locally or remotely, for determining where the data packet is directed.

The inner header 512B information may be used at step 520 in addition to information from other portions of data packets. For example, embodiments of the present invention enable load balancing or packet inspections based on inner headers, and this information may be used in combination with information from outer headers, or with TCP/UDP information from data packets, to optimize the flow of data traffic in the mobile network 518. The flow of data traffic may be optimized among multiple physical links, such as more than one GE link, or a 10 GE link, on a mobile network 518. A 10 GE link indicates data traffic in accordance with a standard intended to facilitate rates of ten gigabits per second. Embodiments of the present invention are capable of operation with one or more GE, or 10 GE, links, or with physical links intended for higher or lower data traffic rates.

Figure 6:
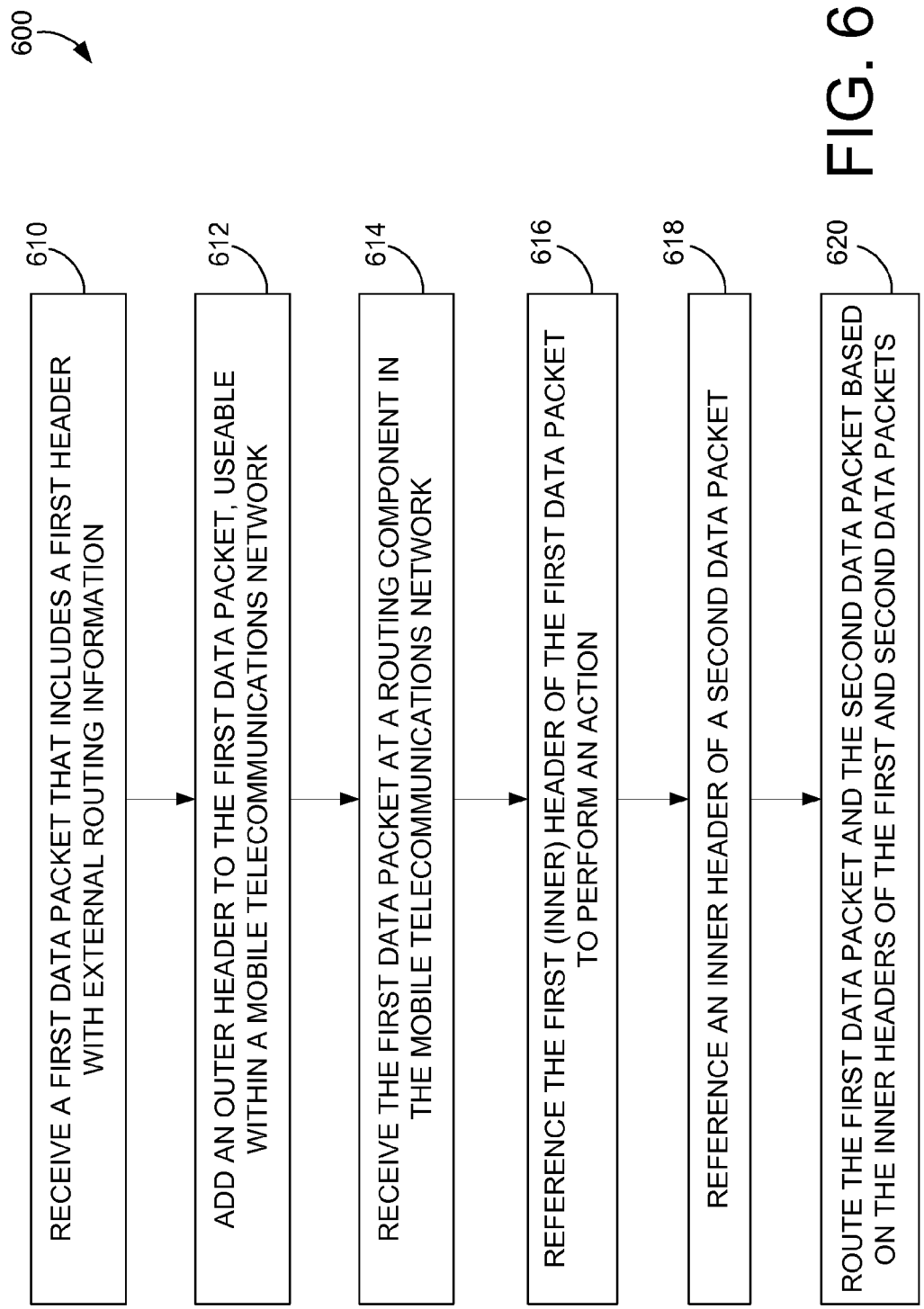
FIG. 6 is a flow diagram illustrating exemplary methods in accordance with embodiments of the present invention.

FIG. 6 is a flow diagram illustrating exemplary methods in accordance with embodiments of the present invention, designated generally by reference numeral 600. As shown at step 610, a first data packet is received with a header indicating an original source and destination, for example data packet 510A with inner header 512A shown in FIG. 5. The inner header information may indicate a source address or a destination address that is used on the Internet, such as an address indicating destination 522 (first device) on Internet 528 in FIG. 5. As shown at step 612 of FIG. 6, an outer header is added to the front of the first data packet, such as outer header 516 of data packet 510B in FIG. 5, that indicates source and destination information used on a mobile telecommunications network, such as mobile network 518.

The front of a data packet indicates the edge of a data packet that is received first by network components during the flow of data packets. In embodiments of the present invention, before ultimate delivery to an original destination address, an outer header, such as outer header 138B of data packet 120B in FIG. 1, is removed from the data packet, and the outer header 138B may be removed, or stripped, from the data packet by the home agent 122, or another device or agent at the edge or interface of a mobile telecommunications network, such as core network 114.

Step 614 shows the first data packet is received by a routing component, such as routing component 126 in FIG. 1, on a mobile telecommunications network, such as core network 114 in FIG. 1. As shown at step 616, the inner header of the data packet is referenced to perform an action in the network. For example, the source or destination information, or both, from an inner header, such as inner header 136B in FIG. 1, may be referenced, along with other data or metadata from the data packet 120B, such as the payload size, format, or other tags. Referencing may include being listed, cached, logged, or otherwise stored for future referencing, accounting, data mining or inspecting, or other actions to analyze or manage data traffic on a mobile telecommunications network, such as core network 114. In an exemplary embodiment, the storing or caching function is done by a network device, such as network device 338 in FIG. 3. The data packet may be rerouted, based on policies or protocols, or software or hardware enforcing policies, such as blocking content from certain sites or types of sites. The data packet, along with one or more other data packets on a mobile telecommunications network, may be subjected to policies that are intended to optimize the flow of data traffic, such as load balancing, as discussed herein with respect to embodiments of the present invention.

As an example, continuing with FIG. 6, a second data packet is received and, at step 618, an inner header of the second data packet is referenced, such as data packet 436, shown with inner header 438 in FIG. 4. In embodiments of the present invention, the first and second data packets are directed based on inner header information, as shown at step 620. For example, the flow of the first and second data packets is optimized, with respect to physical and/or virtual availability, responsiveness or capacity, in exemplary embodiments of the present invention.

Figure 7:
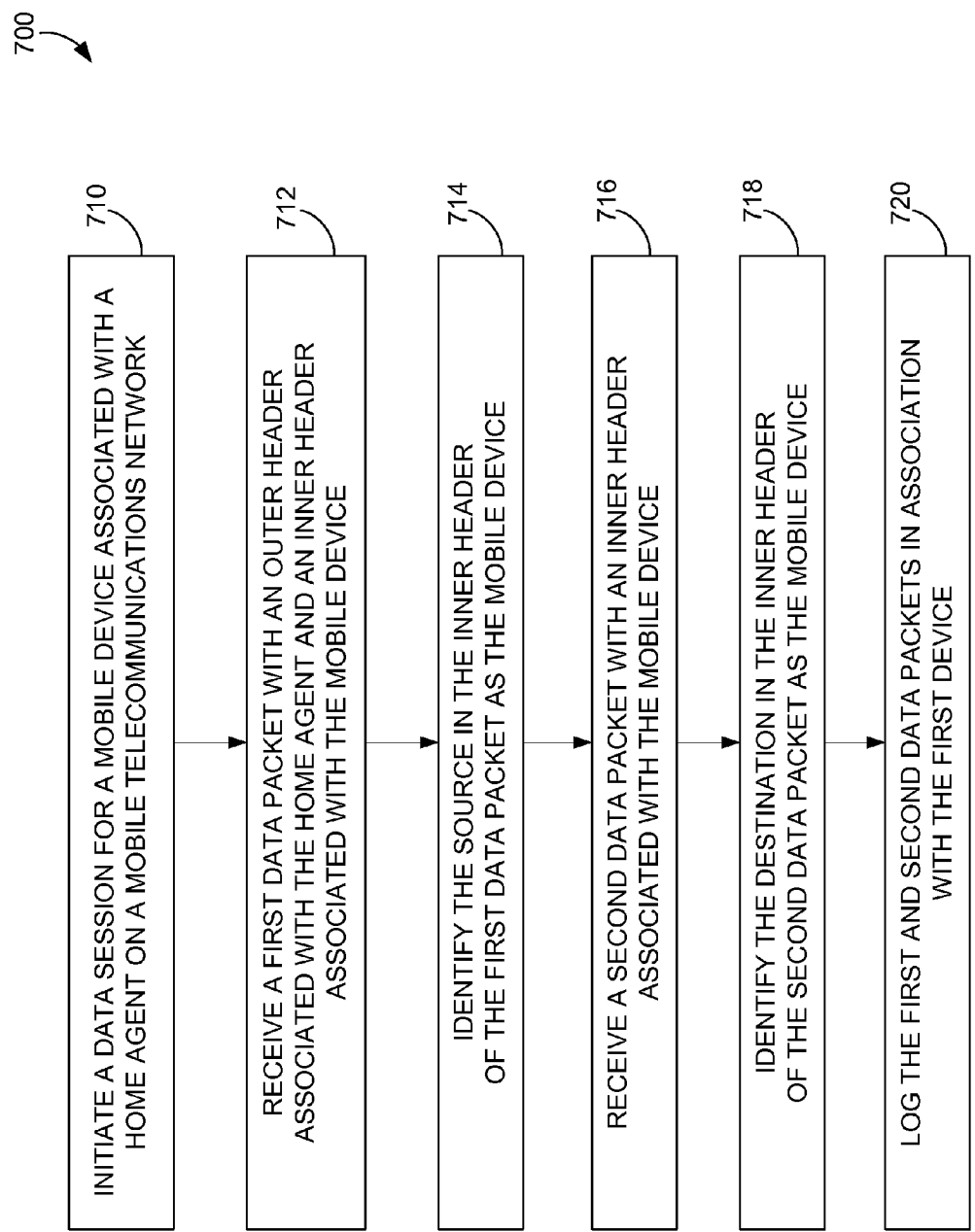
FIG. 7 is a flow diagram illustrating exemplary methods in accordance with embodiments of the present invention.

Turning now to FIG. 7, a flow diagram is shown illustrating methods in accordance with embodiments of the present invention, indicated generally by reference numeral 700. As shown at step 710, a data session begins with a mobile device, such as device 110 in FIG. 1. In embodiments, a data session may be an established connection, a session of connectivity (for a length of time, based on an amount of activity or inactivity, or based on any accounting function), a series of data packet transmissions, or a period of time, during which the mobile device 110 is associated with a home agent, such as home agent 122. At step 712, a first data packet is received, including an outer header and an inner header, for example, data packet 120B, with outer header 138B and inner header 136B, shown in FIG. 1. The inner header of the first data packet is associated with a mobile device (e.g., device 110), and the outer header of the first data packet is associated with a home agent (e.g., home agent 122). A mobile device is recognized as the source of the first data packet based on the inner header, as shown at step 714.

Turning to step 716, a second data packet is received. As shown in FIG. 4, a data packet, such as data packet 436, includes an inner header 438. Inner header 438 indicates mobile device 410 is the original destination of data packet 436. At step 718, as shown in FIG. 7, the mobile device is recognized as the destination of the second data packet based on the inner header, such as inner header 438 in FIG. 4. Embodiments of the present invention log both data packets in association with the mobile device identified in the inner headers of the data packets, as shown at step 720 of FIG. 7. In some cases, data packets may be associated with a source address in an inner header, such as inner header 438 of data packet 436 in FIG. 4, and this source address may indicate restricted content, or a restricted content-provider. Embodiments of the present invention include rerouting, or blocking, a data packet from ultimate delivery, based on the source address in an inner header, FIG. 8 shows a flow diagram illustrating exemplary methods in accordance with embodiments of the present invention, designated generally as 800. On a mobile telecommunications network, such as core network 114, a first data packet is received by a routing component, such as routing component 126. In accordance with an exemplary embodiment of the present invention, and as shown with respect to data packet 210 in FIG. 2, a data packet includes a first set of twenty bytes, such as outer header 212, and a second set of twenty bytes, such as inner header 214. Returning to FIG. 8, and a first set of twenty bytes (of a first data packet) is received first, as shown at step 810. At step 812, a second set of twenty bytes is received by the routing component. In a specific illustration with respect to data packet 120B in FIG. 1, outer header 138B is an example of a set of twenty bytes that is received by routing component 126 prior to a second set of twenty bytes, illustrated by the original, inner header 136B in FIG. 1.

As shown at step 814 in FIG. 8, an IP address is recognized in the second set of twenty bytes (of the first data packet) in an embodiment of the present invention. As discussed above, an address may be a four-byte address, expressed as numerals and decimals, in a header of a data packet, such as inner header 214 or outer header 212 of data packet 210 in FIG. 2, that indicates a source or destination of a data packet. Step 816 shows the first data packet is acted on, based on an address that is identified in the second set of twenty bytes of the first data packet, in an embodiment of the present invention. Acting on a data packet may include, for example, applying a hash algorithm or other formula or application to the address, or using a table or other data structure that contains address information to perform a comparison or look-up function using the address.

Continuing with an exemplary embodiment shown in FIG. 8, at step 818, the first data packet is directed based on the address that was identified in the second set of twenty bytes of the first data packet. In an embodiment of the present invention, a second set of twenty bytes of a second data packet is received, as shown at step 820. This second set of twenty bytes includes a second address. The second data packet is directed based on the address in the second set of twenty bytes of the second data packet, as shown at step 822, in an embodiment of the present invention.

By acting on data packets based on the second set of twenty bytes, additional information about data traffic on a mobile telecommunications network may be used to improve, manage, or monitor the network in exemplary embodiments. For example, embodiments of the present invention use addresses in the second set of twenty bytes of data packets that enable data traffic to be routed, or directed, based on original source and destination information. As a specific example, FIG. 5 illustrates data packet 510B is acted on (classified, identified, routed, stored, monitored, etc.) based on inner header 512B. When data on a mobile telecommunications network is routed based on the outer header information only, conversations, or data flows, between individual mobile devices and Internet addresses are not recognized. Embodiments of the present invention use inner header information to identify and preserve data traffic to and from individual mobile devices, such as mobile device 514, or to and from devices on the Internet, such as first device 522, shown in FIG. 5. This information may be used in combination with other source and destination information to direct data packets based on more than one level of source or destination information.

Embodiments of the present invention enable load balancing options based on inner header information. Data packets with the same, or similar, outer header information, may be destined for different addresses on the Internet, such as destinations 130, 132, and 134 in FIG. 1. As discussed above, in embodiments of the present invention, the data packets may be routed, referenced or otherwise handled (by, for example, routing component 126) based on the different destinations 130, 132, and 134, thereby optimizing the flow of data packets on the core network 114.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer-readable media having computer-executable instructions embodied thereon that, when executed, perform a method of routing a data packet within a wireless telecommunications network ("network"), the method comprising: receiving a first data packet that includes a first header that indicates a first source from where said first data packet came and a first destination to which said first data packet is bound, wherein said first header includes first destination information that is useable outside of said network to properly route said first data packet though the Internet; prepending a second header to the first data packet, such that said first header becomes an inner header and the second header becomes an outer header, wherein said outer header includes routing information that is useable to properly route said first data packet though said network but not through the Internet; receiving the first data packet, including the inner header and the outer header, at a routing component that is within the network; and referencing the inner header to perform an action within said network.

2. The media of claim 1, wherein the first header becomes an inner header located at an offset of approximately twenty bytes from an edge of the data packet.

3. The media of claim 1, wherein the second header is prepended to the data packet by a network component that is identified as the second source.

4. The media of claim 1, wherein said routing information included in said outer header indicates an agent device in the network, wherein the second header is removed from the data packet after the data packet is received by the agent.

5. The media of claim 1, wherein the action is directing the data packet based on the inner header.

6. The media of claim 1, wherein the action includes one or more of the following: preserving a packet order flow to the first destination, storing information about the first data packet based on the inner header, rerouting the first data packet, and performing a deep packet inspection of the first data packet.

7. The media of claim 6, wherein said first data packet includes a payload, and storing information about the first data packet based on the inner header includes storing the first destination and a size of the payload.

8. The media of claim 1, further comprising:
receiving a second data packet, wherein said second data packet includes second destination information that is useable outside of said network to properly route said second data packet through the Internet, and wherein said second destination information is different from said first destination information; and
optimizing an order of the first data packet and the second data packet within said mobile telecommunications network based on the destination information in the inner header of the first data packet, and based on the second destination information in the second data packet.

9. The media of claim 8, wherein optimizing the flow enables load balancing within the wireless telecommunications network.

10. A non-transitory computer-readable media having computer-executable instructions embodied thereon that, when executed, perform a method of logging data traffic that travels through at least a portion of a wireless telecommunications network ("network"), the method comprising: receiving initiation of a connection for sending and receiving data packets by a first device, such that the first device is one of a set of devices associated with a first agent component on said network, wherein said first agent directs data packets from the set of devices to a second agent on said network; receiving a first data packet from the first device at a routing component on said network, including an outer header that has a source address associated with the first agent, and an inner header that has a source address associated with the first device; identifying the source address in the inner header of the first data packet; receiving a second data packet, including an inner header that has a destination address associated with the first device; identifying the destination address in the inner header of the second data packet; and logging the first and second data packets in association with the first device.

11. The media of claim 10, wherein the first and second data packets are logged based on a table including the address associated with the first device.

12. The media of claim 10, wherein the first and second data packets are logged based on a hash algorithm performed on the address associated with the first device.

13. The media of claim 10, further comprising:
determining a source address in the inner header of the second data packet is restricted; and
blocking the second data packet from delivery to the first device based on the source address in the inner header of the second data packet.

14. A non-transitory computer-readable media having computer-executable instructions embodied thereon that, when executed, perform a method of routing a data packet on a mobile telecommunications network, the method comprising: receiving a first data packet at routing component that includes a first set of twenty bytes and a second set of twenty bytes, wherein the first set of twenty bytes precedes the second set of twenty bytes, such that the first set of twenty bytes is received at the routing component before the second set of twenty bytes;
receiving a second data packet that includes a second thirty-two-bit address in the second set of twenty bytes that is different than the first thirty-two bit address in the first data packet; and
pointing the second data packet in a second direction based on the second thirty-two-bit address.

15. The media of claim 14, wherein the first set of twenty bytes is a header added at a network interface link to the mobile telecommunications network.

16. The media of claim 14, wherein classifying the first data packet includes applying an algorithm to at least part of the first thirty-two bit address.

17. The media of claim 14, further comprising pointing the first data packet in a first direction based on the first thirty-two bit address.

18. The media of claim 14, wherein the data packet is one of a set of data packets intended for the first thirty-two bit address, and wherein pointing the data packet preserves an order of the set of data packets.

19. The media of claim 14, wherein the first data packet is pointed towards a first physical link and the second data packet is pointed towards a second physical link.

* * * * *